United States Patent
Macaluso et al.

(10) Patent No.: US 6,380,797 B1
(45) Date of Patent: Apr. 30, 2002

(54) HIGH SPEED LOW VOLTAGE DIFFERENTIAL SIGNAL DRIVER CIRCUIT HAVING LOW SENSITIVITY TO FABRICATION PROCESS VARIATION, NOISE, AND OPERATING TEMPERATURE VARIATION

(75) Inventors: Steven Mark Macaluso; Stephen James O'Brien, both of Scarborough, ME (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 09/697,707

(22) Filed: Oct. 25, 2000

(51) Int. Cl.[7] ............................................. H01L 35/00
(52) U.S. Cl. .......................... 327/513; 327/83; 327/362
(58) Field of Search ........................... 327/513, 83, 362, 327/138, 262, 378, 560–563

(56) References Cited

U.S. PATENT DOCUMENTS

| | | | |
|---|---|---|---|
| 4,220,877 A | * 9/1980 | Giordano | 327/513 |
| 5,796,291 A | * 8/1998 | Mattes et al. | 327/83 |
| 6,163,198 A | * 12/2000 | Cargill | 327/362 |
| 6,236,254 B1 | * 5/2001 | Morgan et al. | 327/362 |

* cited by examiner

*Primary Examiner*—Toan Tran
(74) *Attorney, Agent, or Firm*—Wagner Murabito & Hao LLP (57) ABSTRACT

An LVDS (Low Voltage Differential Signal) driver circuit having low sensitivity to fabrication process variation, power supply noise voltage variation, and operating temperature variation (PVT). The LVDS driver circuit includes a predriver having an input coupled to an internal circuit. The predriver is coupled to a current source. The current source includes a first resistance and is configured to produce a reference current through the first resistance. The reference current is coupled to the predriver to control an output swing of the predriver, the output swing determined by a ratio of the first resistance and a second resistance in the predriver. The ratio of the first and second resistance is such that the output swing is constant across PVT. An output driver is coupled to the predriver to receive the output swing. The output driver has an output for coupling an output signal to an external circuit. The output driver uses the output swing from the predriver to generate the output signal in accordance with the output swing such that the output signal is constant across PVT. The output swing also controls first and second current limiting transistors included in the output driver to limit current flowing through the output driver, thereby limiting power consumption of the LVDS driver circuit.

16 Claims, 4 Drawing Sheets

HIGH SPEED LOW VOLTAGE DIFFERENTIAL SIGNAL DRIVER CIRCUIT HAVING LOW SENSITIVITY TO FABRICATION PROCESS VARIATION, NOISE, AND OPERATING TEMPERATURE VARIATION

TECHNICAL FIELD

The present invention relates to the field of high speed digital integrated circuits. More particularly, the present invention relates to a high speed output driver for use with high speed digital integrated circuits.

BACKGROUND ART

Within the communications industry, there is an ever increasing need for higher data processing rates. For example, microprocessor designs are continuously increasing in operating frequency, data transmission circuit designs are transmitting data at faster and faster rates, and memory circuit designs are operating at higher and higher bandwidths. Each of the above integrated circuit types rely on output drivers to transmit data from inside the circuit to external circuits or devices. The drivers receive internal signals and drive coupled signal lines to transmit the signals to the external circuits or devices.

As operating speeds increase, and as the level of integration increases (e.g., several million transistors per die), the performance specifications for the "signal drivers" become more demanding. Typical high performance signal driver specifications include, for example, requirements for high data transfer rates with low power consumption, high signal quality without increasing power consumption, and reduced jitter to maintain high data transfer rates. Designing and fabricating signal drivers that fulfill such high performance specifications is problematic.

One type of high performance signal driver is the Low Voltage Differential Signal Driver (e.g., LVDS driver). LVDS drivers are well known and widely used in the electronics industry. Within the digital communications field, for example, LVDS drivers are used in a variety of applications. Such applications include, for example, pulse code modulation, serial bus signal generation (e.g., serial transmission clock recovery), and the like. LVDS drivers are typically designed to function within certain performance specifications and such specifications include a given set of boundary conditions. Typical conditions include, for example, performance over operating temperature ranges, sensitivity to vibration, output sensitivity to interference, and the like. Typical performance standards include, for example, output signal phase and frequency stability, output signal programmability, and the like.

The high data rate applications in which an LVDS driver is used dictates its operating conditions and performance requirements. With most LVDS driver applications, it is usually important that the output phase and signal level of the LVDS driver is stable and is a consistent function of the control inputs (e.g., voltage, capacitance, and the like). The output phase and signal level should also be stable with respect to the different "process corners" of the fabrication process used to manufacture the LVDS driver and should be constant over different operating temperatures and voltages.

For example in a case where a prior art LVDS driver is used in an application for clock recovery in a serial transmission system, it is important that the output phase and signal level remain stable and constant. The output phase is used to reconstruct a serial transmission clock signal, which in turn, is used to sample data on a serial transmission line. Distortion or variation in the LVDS driver output phase, and hence, the reconstructed clock signal, can lead to sampling errors, lost data, decreased throughput, or other such problems. Consequently, for these applications it is important that the LVDS driver provide a very stable, jitter free, and noise free output signal.

Additionally, high frequency operation at high data rates increases the power consumption of the LVDS driver circuits. For example, high switching speeds lead to large amounts of electric switching currents within the circuits. The high power consumption causes excessive heat generation that limits the maximum speed of the circuit. Thus, power consumption is a limiting factor in the maximum speed at which LVDS driver circuits can operate.

Another problem prior art LVDS drivers is the need to contend with power supply noise. Noise, especially low frequency noise, in the power supply can have a detrimental effect on the LVDS driver's output stability. As a typical LVDS driver draws current from a power supply, the low frequency noise with this current (or voltage), or noise from other external devices (e.g., electromagnetic interference), can affect the output signal stability. Power supply noise typically manifests itself as jitter on the rising and falling edges of the output signal, frequency skew in the output signal, or other distortions in the fidelity of the output.

Another problem is the effect of differing manufacturing process corners. Each manufactured LVDS driver is processed in fabrication facility and is subject to the particular variables of the specific manufacturing process employed. These variables are tightly controlled in an effort to make the fabricated devices as uniform as possible. However, even the most closely monitored, tightly controlled, fabrication process has some variation, from batch to batch, of the process variables. This variation leads to slight performance variation within "families" of fabricated devices. The limits of this variation are referred to in the industry as process corners. Hence, each nominal device emerging from fabrication will have some statistical performance variation within the process corners. At times, this variation is large enough to limit the applications to which a particular device is suited. In more severe cases, the variation can intermittently disrupt a system which includes the particular device.

Another problem is the temperature dependent variation in the output phase stability of prior art LVDS drivers. Typical prior art LVDS drivers have difficulty maintaining a stable, constant output frequency as their operating temperatures change. When temperature increases or decreases, their output phase tends to increase or decrease correspondingly. This variation can have a detrimental effect on the application in which a particular LVDS driver is used.

Thus, what is required is an LVDS driver circuit which maintains a more constant, non-varying output frequency over differing operating temperatures. and voltages, in comparison to the prior art. What is required is a LVDS driver circuit which solves the power supply noise problems associated with the prior art. In addition, what is required is a circuit which maintains a constant jitter-free output phase across the process corners. The present invention provides a novel solution to the above requirements.

SUMMARY OF THE INVENTION

The present invention provides a driver circuit which maintains a more constant, non-varying output frequency over differing operating temperatures, in comparison to the prior art. The driver circuit of the present invention solves the power supply noise problems associated with the prior art. In addition, the driver circuit of the present invention maintains a constant jitter-free output phase across the process corners.

In one embodiment, the present invention is implemented as an LVDS driver circuit including a predriver, having an input coupled to an internal circuit, an output driver, having an output for coupling an output signal to an external circuit, a current source, and a replica bias circuit. The LVDS driver circuit is configured to have low sensitivity to fabrication process variation, power supply noise voltage variation, and operating temperature variation (PVT). The current source is coupled to provide a reference current to the predriver. The current source includes a first resistance and is configured to produce the reference current through the first resistance. The reference current is coupled to the predriver to control an output swing of the predriver, the output swing determined by a ratio of the first resistance and a second resistance located in the predriver.

The ratio of the first and second resistance and the fact that they are fabricated in exactly the same manner and the same process ensures the output swing is constant across PVT. The output driver is coupled to the predriver to receive the output swing. The output driver uses the output swing from the predriver to generate the output signal in accordance with the output swing. Since the output swing is constant across PVT, the output signal is also constant across PVT. The output swing also controls first and second current limiting transistors included in the output driver to limit current flowing through the output driver, thereby limiting power consumption of the LVDS driver circuit. Limiting power consumption limits heat generation and helps the LVDS driver circuit operate at higher switching speeds. Additionally, the predriver includes first and second levels to switch the voltage swing at high speeds with lower power consumption. The replica bias circuit provides a bias signal to both the predriver and the output driver. The replica bias circuit mimics the voltage and current characteristics of the predriver and the output driver in order to provide biasing feedback through the bias signal to keep a voltage offset of the output signal constant across PVT.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention comprises an LVDS driver circuit which maintains a more constant, non-varying output frequency over differing operating temperatures, in comparison to the prior art. The LVDS driver circuit of the present invention solves the power supply noise problems associated with the prior art. In addition, the LVDS driver circuit of the present invention maintains a constant jitter-free output phase across the process corners. The present invention and its benefits are further described below.

Figure 1:
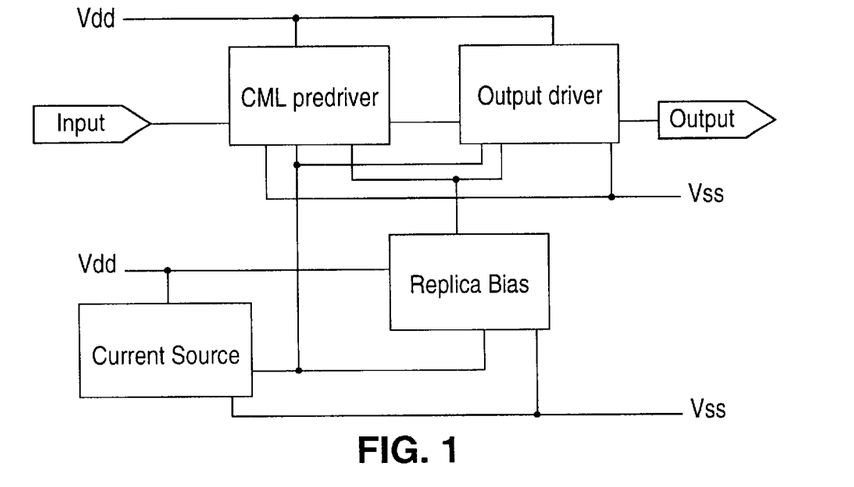
FIG. 1 shows a block diagram of a LVDS driver circuit in accordance with one embodiment of the present invention.

FIG. 1 shows a schematic block diagram of a LVDS driver circuit 100 in accordance with one embodiment of the present invention. LVDS driver circuit 100 is implemented as a portion of an overall integrated circuit device. As depicted in FIG. 1, LVDS driver circuit 100 includes the following components: a CML (current mode logic) predriver 101, an output driver 102, a replica bias circuit 103, and a current source 104. Components 101–104 are each coupled to a power supply, Vdd 103, and a ground, Vss 140, as shown. CML predriver 101 is coupled to input 110 to receive an input signal from, for example, internal circuits of the overall integrated circuit device. CML predriver 101 generates an output swing 170 and couples the output swing 170 to output driver 102. Output driver 102 generates an output signal 120 in accordance with the output swing 170. The output signal 120 is coupled, for example, to external circuits outside the overall integrated circuit device. Replica bias circuit 103 is coupled to provide a bias signal 160 to CML predriver 101 and output driver 102. Current source 104 is coupled to provide a reference current signal 150 to CML predriver 101, output driver 102, and replica bias circuit 103.

Referring still to FIG. 1, the components 101–104 of LVDS driver circuit 100 are configured to maintain a more constant, non-varying output frequency over differing operating temperatures, and solves the power supply noise problems associated with the prior art. In addition, the LVDS driver circuit 100 of the present embodiment maintains a constant jitter-free output phase across the process corners. A general description of the operation of LVDS driver circuit 100 as depicted in FIG. 1 follows.

In normal operation, current source 104 functions in part by generating reference current signal 150 which is used to control the overall voltage range of output swing 170 of CML predriver 101. Due to the internal configuration of CML predriver 101, the current flowing through CML predriver 101 from Vdd 130 to Vss 140 will be precisely controlled by reference current signal 150. The voltage range of output swing 170 is directly controlled by reference current signal 150.

The output driver 102 is coupled to the CML predriver 101 to receive the output swing 170. The output driver 102 uses the output swing 170 to generate the output signal 120. Output 120 thus is directly controlled by output swing 17. Since the output swing 170 is constant across PVT, the output signal 120 is also constant across PVT. The output swing 170 also controls first and second current limiting transistors (shown in FIG. 2) included in the output driver 102 to limit current flowing through the output driver 102, thereby limiting power consumption of the LVDS driver circuit 100. Limiting power consumption limits heat generation and helps the LVDS driver circuit 100 operate at higher switching speeds. Additionally, the CML predriver 101 includes first and second levels (shown in FIG. 2) to switch the output swing 170 at high speeds with lower power consumption. The replica bias circuit 103 provides a bias signal 160 to both the CML predriver 101 and the output driver 102. The replica bias circuit 103 mimics the voltage and current characteristics of the CML predriver 101 and the output driver 102 (at reduced current levels) in order to provide biasing feedback through the bias signal 160 to keep a voltage offset of the output signal 120 constant across These features allow the driver circuit 100 to transmit data at the very high speeds very reliably. Incoming data is received from internal circuits at input 110. The input 110 signal is received at the current mode logic predriver 101 and the output swing 170 is generated in response thereto. The output voltage swing 170, corresponding to input 110, is driven to external circuits via output signal 120 by output driver 102. Current source 104 provides the reference current signal 150 which stabilizes output signal 120, and replica bias circuit 103 provides the bias signal 160 which maintains the stable voltage offset of output signal 120.

Figure 2:
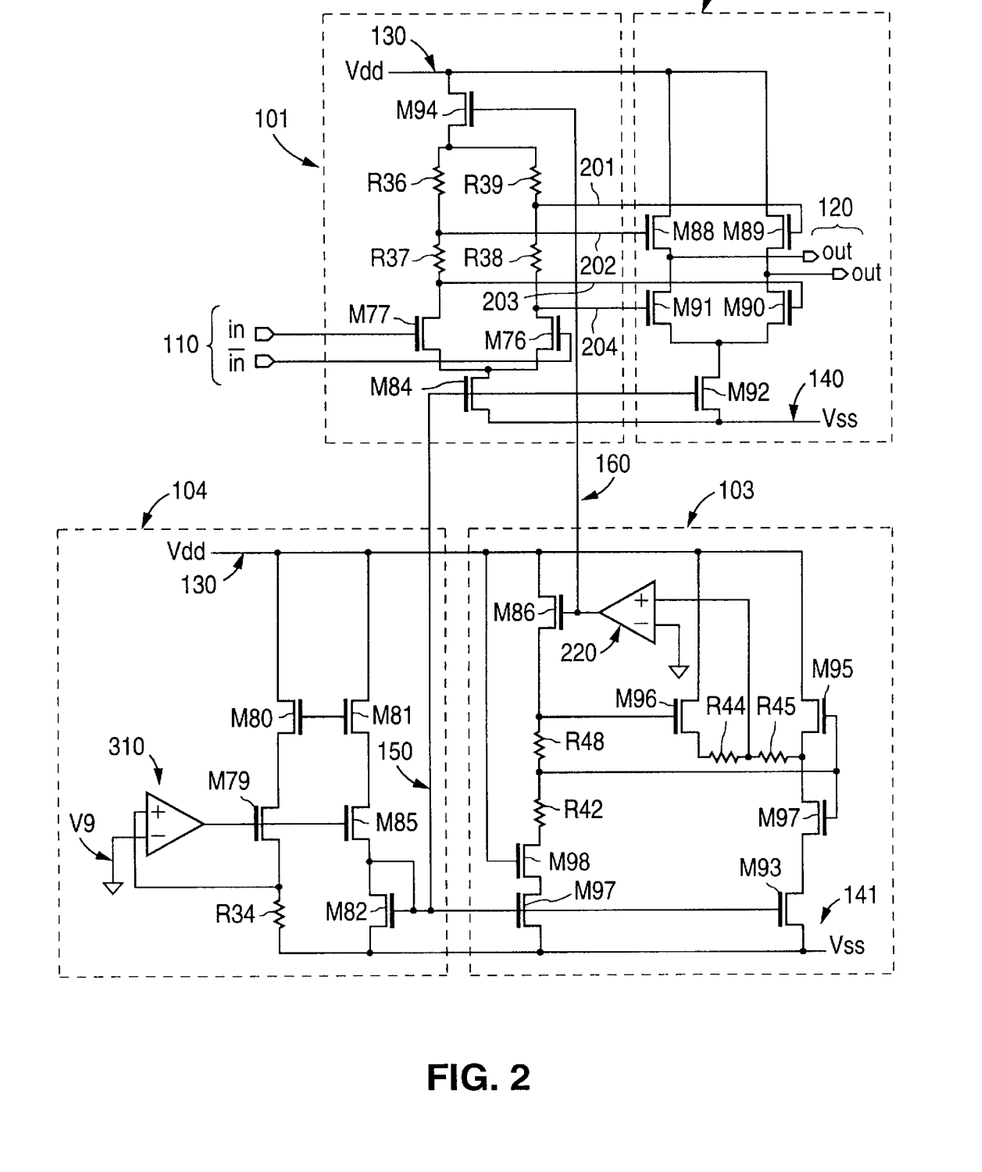
FIG. 2 shows a more detailed schematic diagram showing circuitry of the components of LVDS driver circuit in accordance with one embodiment of the present invention is shown.

With reference now to FIG. 2, a more detailed schematic diagram showing circuitry of the components of LVDS driver circuit 100 in accordance with one embodiment of the present invention is shown. As depicted in FIG. 2, components 101–104 are shown by corresponding dotted-line boxes. The current mode logic predriver 101 includes transistors, M94, M77, M76, and M84 along with resistors R36, R37, R38, and R39. Input 110 is coupled as shown. The output driver 102 includes transistors M88, M89, M90, M91, and M92. Output signal 120 is coupled as shown. Lines 201–204 comprise output swing 170 from FIG. 1. Replica bias circuit 103 includes transistors M86, M98, M99, M93, M97, M95, and M96 along with resistors R40, R42, R44, and R45. The bias signal 160 is coupled as shown. The current source 104 includes transistors M80, M81, M79, M85, and M82 along with resistor R34. The reference current signal 150 is coupled as shown.

As described above, the four major components of driver circuit 100 are the current mode logic predriver 101, output driver 102, replica bias circuit 103, and current source 104. A description of the interaction of the circuits of components 101–104 follows.

As described above, the current source 104 produces the reference current signal 150, which in turn, controls output swing 201–204. In this embodiment, a reference current is generated by placing a 1.25 V source, V9, on top of a resistor, R34, using amplifier 210. The resulting current in M80 is 1.25 V/R34. The current in M80 is mirrored into M81. The current in M82 is also 1.25/R34. By virtue of the fact that M82 is diode connected and is tied to the gate of M84 by the reference current signal 150, the current flowing through M84 is now some multiple (m) of the current in R34. The result is a current m*(1.25/R34). This current now is used to set the voltage swing of the output swing 201–204 of the current mode logic predriver 101. In the present embodiment, R36, R37, R38, and R39 are all equal. Since the current is m* (1.25/R34), and R36=R37=R38=R39, then the voltage across each of these resistors is m*1.25(R36/R34), which is just a ratio of resistor that remains constant across process, voltage and temperature (PVT). Hence, where R34 is referred to as the first resistance (within current source 104), and R36 is referred to as the second resistance (within CML predriver 101), output swing 201–204 is determined by the ratio of the first resistance and the second resistance.

The fact that output swing 201–204 is determined by a ratio of resistors is an attribute that helps make output signal 120 constant across PVT. When resistors are fabricated using semiconductor fabrication techniques, their relative characteristics tend to be constant with respect to each other from batch to batch, production run to production run. Any process variables that affect one resistance within an integrated circuit die tends to affect each resistance within the integrated circuit die equally. Setting the output swing 201–204 using a ratio of the resistances helps to cancel PVT variations.

Referring still to FIG. 2, the total voltage swing of output swing 201–204 for the CML predriver 101 is 800 mV, 400 mV across each of resistors R36, R37, R38, and R39. The 400 mV swing of output swing 201–202 is used to drive the source follower, the top two transistors M88 and M89 of the output driver section 102. This 400 mV swing, due to the properties of the source follower, is what is seen across output 120 (e.g., out and out bar). This output 120 is virtually constant regardless of PVT.

The 800 mV predriver swing of output swing 203–204 is used to drive the lower transistors M90 and M91 of the output driver 102. The 800 mV is necessary to be able to turn M91 and M90 of the output driver 102 on and off like switches and not a differential pair. It should be noted that the two transistors M91 and M90 operate in their linear region, however, such operation is not problematic due to the fact that M91 and M90 are large and not overly resistive. Hence, M90 and M91 are important attributes of LVDS driver circuit 100 since they limit the excess current in the output stage (e.g., output driver 102) and allow more current to go directly to the load (e.g., output 120). As described above, less current translates into less power consumption, less heat generation, and higher operating speed.

To provide increased insensitivity to noise on the power supply (e.g., Vdd 130), LVDS circuit 100 uses source-follower transistors for M94, M88, and M89. The source-follower transistors help to isolate the output 120 from noise induced voltage variations on Vdd.

Referring still to FIG. 2, another feature of LVDS driver circuit 100 is the two levels of CML predriver 101. The two levels working together switch the output swing 201–204 at higher speeds with lower power. A first level comprises the nodes above resistors R37 and R38 which generate output swing signals 201 and 202 respectively. A second level comprises the nodes above transistors M77 and M76 which generate output swing signals 203 and 204 respectively. These two levels generate the voltage is required to properly switch transistors M88 and M89 and transistors M91 and M90 of output driver 102. Transistors M77 and M76 function by routing current from transistor M94 to M84 through either the left side of predriver 101 (e.g., resistors R36 R37) or the right side of predriver 101 (e.g., resistors R39 R38). Transistors M77 and M76 ensure current flows through only one side of predriver 101 at any given time, in accordance with inputs 110, thereby limiting power consumption.

Replica bias circuit 103 functions by maintaining the stability and consistency of the output signal 120. As described above, the output swing 201–204 of predriver 101 and output signal 120 of output driver 102 are constant at 400 mV. However, the output offset (VOS) of the output signal 120 is generally not. This problem was solved by a method called replica biasing. The left most stack of transistors (e.g., transistors M86, M98, and M99) in the replica bias circuit 103 comprises a reduced current version of the CML predriver 101 (e.g., transistors M94, M77, and M84). The right most stack of transistors (e.g., transistors M95, M97, and M93) comprises a reduced current version of the output driver 102 (e.g., transistors M89, M90, and M92). The output of an amplifier 220 and the resulting negative feedback (e.g., via transistor M96 and resistor R44) combine to keep the point between R44 and R45 at a constant voltage. The voltage chosen is 1.2 V, which will serve as the VOS of the output driver 102. The gate of M86 is modulated by the output of amplifier 220 to maintain this VOS and is tied to M94 via the bias signal 160. In so doing, the drain of M94 moves up or down so as to keep the center point (VOS) of any load across output 120 (out and out bar) at VOS (e.g., 1.2 V).

These transistors are designed and fabricated to have matching current and voltage characteristics. Consequently, the bias signal 160 causes matching corresponding corrections within CML predriver 101 to counteract the process related effects of PVT. For example, where a normal process variation affects the electrical characteristics of n-type or p-type transistors, the same process variation affects the electrical characteristics of the replica bias circuit 103. In so doing, the bias signal 160 is similarly affected, which in turn, causes a counteracting correction in CML predriver 101. This reduces the effect of the normal variation across the process corners.

In addition, the bias signal 160 varies in response to temperature to correct temperature based VOS error. For example, as the circuits of predriver 101 and output driver 102 operate, they draw current from Vdd and generate heat. As the operating temperature of LVDS driver circuit 200 increases, electron mobility decreases, affecting the stability of VOS. The bias signal 160, however, changes in response to changing operating temperature in such a way as to counteract the tendency of the VOS of LVDS driver circuit 200 to drift. The bias signal 160 causes an increase or decrease in the amount of current drawn by the LVDS driver circuit 200 in order to compensate for the effects on the VOS. This allows LVDS driver circuit 200 to maintain a substantially stable and constant output offset even as the temperature environment (e.g., the operating temperature) changes.

Figure 3:
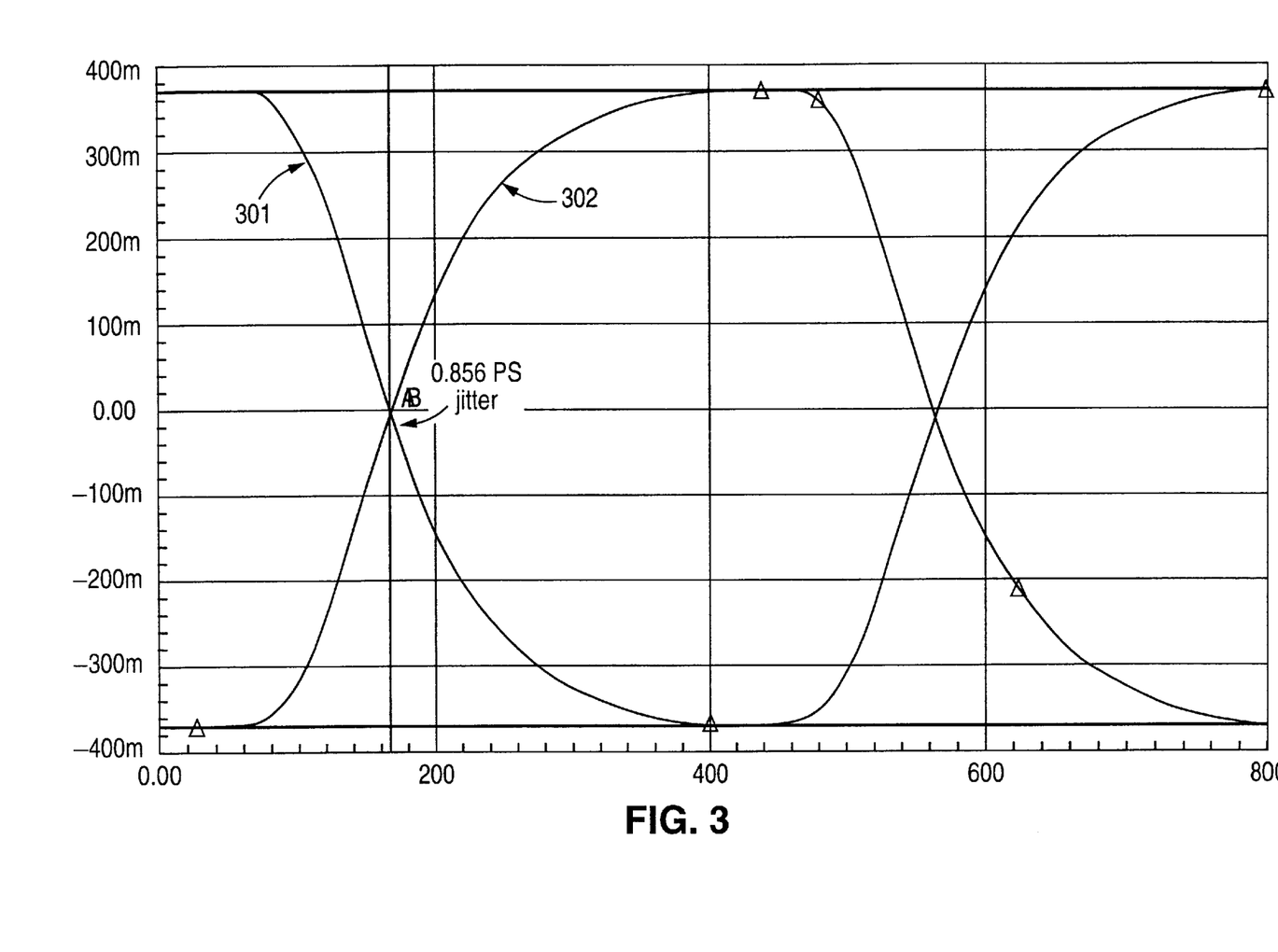
FIG. 3 shows a first graph depicting the low jitter characteristics of the output of an LVDS driver circuit in accordance with one embodiment of present invention.

FIG. 3 shows a graph depicting the low jitter characteristics of the output 120 of an LVDS driver circuit (e.g., LVDS driver circuit 100) in accordance with one embodiment of present invention. FIG. 3 shows results where a typical manufacturing process is used to fabricate the LVDS driver circuit. As depicted in FIG. 3, the vertical axis on the left side of FIG. 3 shows the voltage level of the LVDS driver circuit output (e.g., output signal 120). The horizontal axis across the bottom of FIG. 3 shows the timer scale of the graph. Trace 301 shows one signal of output 120 (e.g., "out") and trace 302 shows the other signal of output 120 (e.g., "out bar"). As shown in FIG. 3, trace 301 and trace 302 cross 0.00 V within 0.856 pico seconds of each other, for a very low jitter rate.

Figure 4:
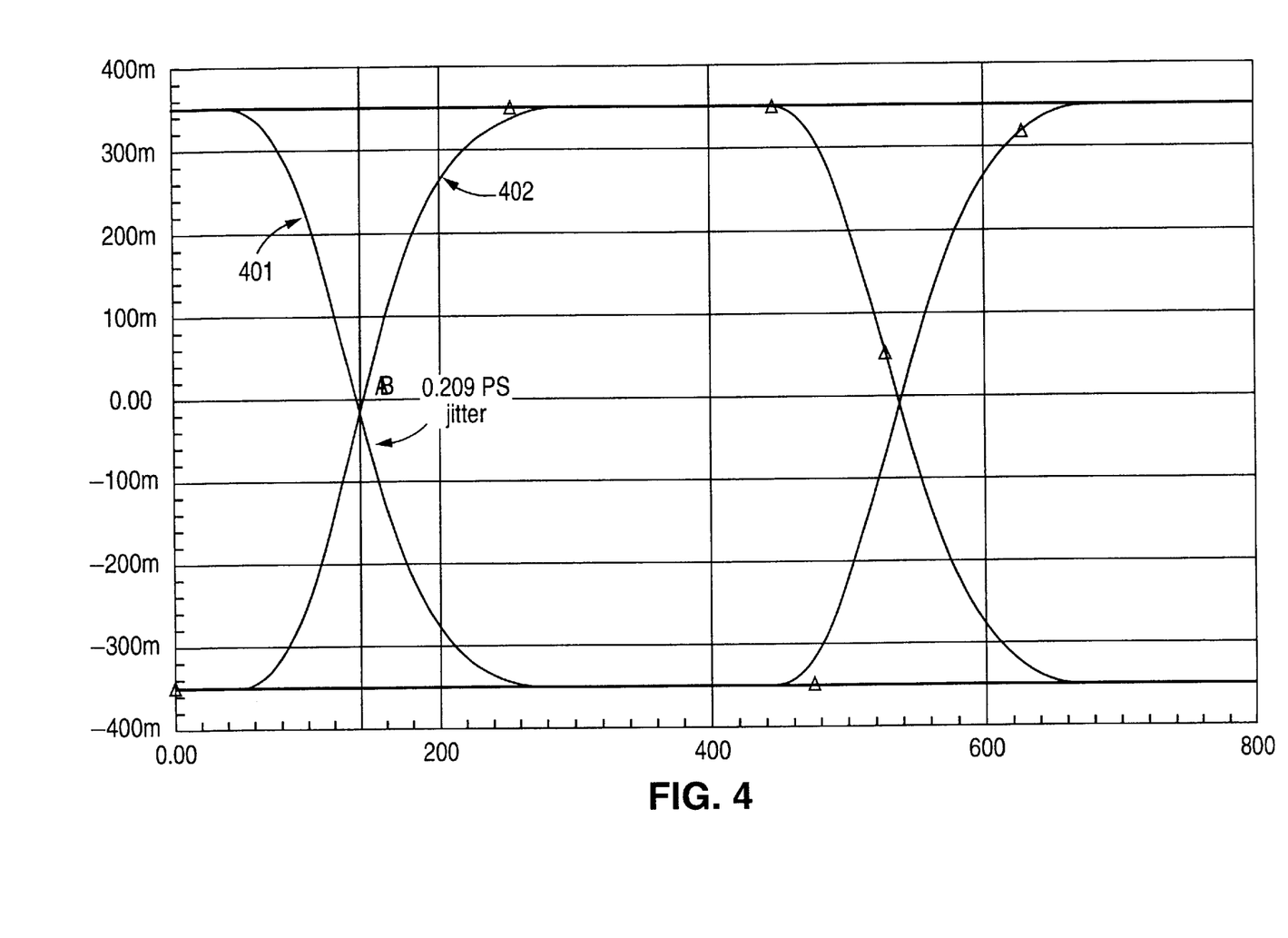
FIG. 4 shows a second graph depicting the low jitter characteristics of the output of an LVDS driver circuit in accordance with one embodiment of present invention.

FIG. 4 shows a graph depicting the low jitter characteristics of the output 120 of an LVDS driver circuit (e.g., LVDS driver circuit 100) in accordance with another embodiment of present invention. FIG. 4 shows results where a "fast" manufacturing process is used to fabricate the LVDS driver circuit. As depicted in FIG. 4, the vertical axis on the left side shows the voltage level of the LVDS driver circuit output (e.g., output signal 120) and the horizontal axis across the bottom of FIG. 4 shows the time scale of the graph. Trace 401 shows one signal of output 120 (e.g., "out") and trace 402 shows the other signal of output 120 (e.g., "out bar"). In this embodiment, trace 401 and trace 402 cross 0.00 V within 0.209 pico seconds of each other, for an even lower jitter rate.

Figure 5:
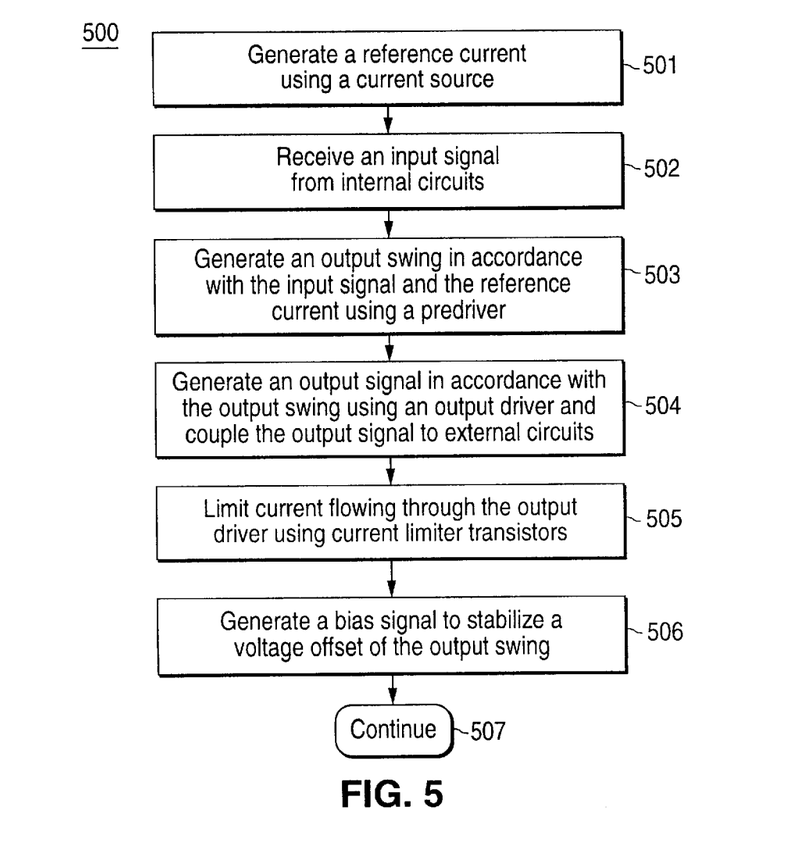
FIG. 5 shows a flowchart of the steps of an operating process of an LVDS driver circuit in accordance with one embodiment of the present invention.

FIG. 5 shows a flow chart of the steps of a process 500 in accordance with one embodiment of the present invention. As depicted in FIG. 5, process 500 shows the general operating steps of an LVDS driver (e.g., LVDS driver 100 of FIG. 2) as it receives an input signal from internal circuits and drives a resulting output signal out to external circuits.

Process 500 begins in step 501, where a LVDS driver circuit (e.g., LVDS driver circuit 100 from FIG. 2) uses an included current source (e.g., current source 104) to generate a reference current. As described above, the current source uses a precisely controlled voltage (e.g., 1.25 V) placed across a resistor (e.g., R34) to create the reference current signal. This resistor is fabricated such that its current and voltage characteristics precisely match those of a set of resistors in a predriver of the LVDS driver circuit.

In step 502, an input signal from internal circuits is received at the input of a predriver (e.g., CML predriver 101) of the LVDS driver circuit. The input signal comprises, for example, logic signals from internal circuits that need to be driven off-chip to external circuits.

In step 503, the predriver uses the input signal and the reference current signal from the current source to generate an output swing (e.g., output swing 201–204). As described above, the voltage characteristics of the output swing are in accordance with the reference current signal and the input signal. The output swing is used to control the output driver. The predriver is configured such that the voltage characteristics of the output swing are determined by a ratio of the resistor used to create the reference current signal in the current source (e.g., R34) and the set of resistors in the predriver (e.g., R36–R39). This ratio tends to remain constant across PVT variations.

In step 504, an output driver (e.g., output driver 102) receives the output swing from the predriver and the reference current signal from the current source and generates an output signal (e.g., output signal 120) in accordance thereto. The output driver thus drives the input signal to externally coupled circuits as the output signal. The output signal has an output swing matching the output swing received from the predriver.

In step 505, a set of current limiting transistors within the output driver limit current flowing through the output driver. The current limiting transistors are controlled in part by the output swing from the predriver and limit the total amount of current flowing through the output driver to ground. Limiting total current limits power consumption and heat generation, increasing the maximum operating speed of the LVDS driver circuit.

In step 506, a replica bias circuit is used to generate a replica bias signal (e.g., bias signal 160) to stabilize a voltage offset of the output swing of the output signal. As described above, the replica bias circuit (e.g., replica bias circuit 103) uses a replica of a portion of the predriver and a portion of the output driver to replicate their respective voltage and current characteristics. These characteristics are used to generate the bias signal. Thus, as the voltage and current characteristics of the predriver and the output driver change with variations in PVT, the bias signal also changes, such that the bias signal adjusts the voltage offset to remain constant.

In this manner, as shown in step 507, the LVDS driver circuit continues to function, receiving high speed inputs from internal circuits and driving the corresponding outputs out to external circuits, all while maintaining a stable output swing and voltage offset.

Thus the present invention comprises an LVDS driver circuit which maintains a more constant, non-varying output frequency over differing operating temperatures, in comparison to the prior art. The LVDS driver circuit of the present invention solves the power supply noise problems associated with the prior art. In addition, the LVDS driver circuit of the present invention maintains a constant jitter-free output phase across the process corners.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An LVDS (Low Voltage Differential Signal) driver circuit having low sensitivity to fabrication process variation, power supply noise voltage variation, and operating temperature variation (PVT), comprising:

a predriver having an input coupled to an internal circuit;

a current source coupled to the predriver, the current source configured to produce a reference current through a first resistor included in the current source, the reference current configured to control an output swing of the predriver, the output swing determined by a ratio of the first resistor and a second, third, and fourth resistor in the predriver, wherein the second, third, and fourth resistor are equal, and wherein the ratio is the ratio of resistance between the first resistor and the second resistor such that a magnitude of the output swing is constant across PVT; and an output driver having an output for coupling an output signal to an external circuit, the output driver coupled to receive the output swing from the predriver and generate the output signal in accordance with the output swing such that a magnitude of the output signal is constant across PVT.

2. The LVDS driver circuit of claim 1 wherein the current source includes an amplifier configured to produce a reference voltage for the first resistor to produce the reference current flowing through the first resistor.

3. The LVDS driver of claim 1 wherein the output swing controls first and second source follower transistors included in the output driver to produce the output signal.

4. The LVDS driver circuit of claim 1 wherein the output swing controls first and second current limiting transistors included in the output driver to limit current flowing through the output driver.

5. The LVDS driver circuit of claim 1 further comprising a replica bias circuit for generating a bias signal for the predriver, the bias signal biasing the predriver to maintain a substantially constant voltage offset of the output swing.

6. In an integrated circuit die, an LVDS (Low Voltage Differential Signal) driver circuit having low sensitivity to fabrication process variation, power supply noise voltage variation, and operating temperature variation (PVT), comprising:

a predriver having an input coupled to an internal circuit within the integrated circuit die;

a current source coupled to the predriver, the current source configured to produce a reference current through a first resistor included in the current source, the reference current configured to control an output swing of the predriver, the output swing determined by a ratio of the first resistor and a second resistor in the predriver such that a magnitude of the output swing is constant across PVT;

an output driver having an output for coupling an output signal to an external circuit external to the integrated circuit die, the output driver coupled to receive the output swing from the predriver and generate the output signal in accordance with the output swing such that a magnitude of the output signal is constant across PVT;

a replica bias circuit for generating a bias signal for the predriver, the bias signal biasing the predriver to maintain a substantially constant voltage offset of the output swing; and a third, a fourth, a fifth, and a sixth resistor included in the predriver, wherein the second, third, fourth, fifth, and sixth resistors are equal, and wherein a respective voltage across the second, third, fourth, fifth, and sixth resistors is equal, the respective voltage drop used for the output swing.

7. The LVDS driver circuit of claim 6 further including: an amplifier for placing a predetermined voltage across the first resistor to produce the reference current.

8. The LVDS driver circuit of claim 6 wherein the current source includes an amplifier configured to produce a reference voltage for the first resistor to produce the reference current flowing through the first resistor, a voltage drop across the first resistor used to generate a reference current signal coupled to the predriver.

9. The LVDS driver of claim 6 wherein the output swing controls first and second source follower transistors included in the output driver to produce the output signal.

10. The LVDS driver circuit of claim 6 wherein the output swing controls first and second current limiting transistors included in the output driver to limit current flowing through the output driver.

11. The LVDS driver circuit of claim 6 wherein the replica bias circuit includes a replica of a portion of the predriver and a replica of a portion of the output driver for generating the bias signal for the predriver.

12. In a integrated circuit die, a method for producing an LVDS (Low Voltage Differential Signal) output signal having low sensitivity to fabrication process variation, power supply noise voltage variation, and operating temperature variation (PVT), comprising the steps of:

a) generating a reference current using a current source, the current source configured to produce the reference current through a first resistor included in the current source;

b) receiving an input signal from internal circuits within the integrated circuit die, the input signal received at a predriver coupled to the current source;

c) generating an output swing in accordance with the input signal and the reference current using the predriver, the output swing determined by a ratio of a first resistor in the current source and a second resistor in the predriver such that a magnitude of the output swing is constant across PVT;

d) generating an output signal in accordance with the output swing using an output driver, the output driver coupled to receive the output swing from the predriver;

e) limiting current flowing through the output driver using current limiter transistors, the current limiter transistors controlled by the output swing;

f) generating a bias signal to stabilize a voltage offset of the output swing across PVT, the bias signal generated by a replica bias circuit; and g) producing the output swing by using a third, a fourth, a fifth, and a sixth resistor included in the predriver, wherein the second, third, fourth, fifth, and sixth resistors are equal, and wherein a respective voltage across the second, third, fourth, fifth, and sixth resistors is equal, the respective voltage drop used for the output swing.

13. The method of claim 12 further including the steps of:

generating the output signal in accordance with the output swing such that a magnitude of the output signal is constant across PVT; and generating the bias signal for the predriver wherein the bias signal biases the predriver to maintain a substantially constant voltage offset of the output swing.

14. The LVDS driver circuit of claim 12 further including the steps of:

producing the reference current signal by using an amplifier to place a predetermined voltage across the first resistor.

15. The LVDS driver of claim 12 further including the step of controlling first and second source follower transistors to produce the output signal, wherein the output swing controls first and second source follower transistors.

16. The LVDS driver circuit of claim 12 further including the step of limiting the current flowing through the output driver by using the output swing to control first and second current limiting transistors included in the output driver.

* * * * *